(12) United States Patent
Liu (10) Patent No.: US 8,810,506 B2
(45) Date of Patent: Aug. 19, 2014

(54) LIQUID CRYSTAL DISPLAY DEVICE WITH TOUCH FUNCTION AND TOUCH PANEL

(75) Inventor: Tzu-Wei Liu, Hsin-Chu (TW)

(73) Assignee: AU Optronics Corp., Hsinchu (TW)

( * ) Notice: Subject to any disclaimer, the term of this patent is extended or adjusted under 35 U.S.C. 154(b) by 759 days.

(21) Appl. No.: 12/967,701

(22) Filed: Dec. 14, 2010

(65) Prior Publication Data

US 2011/0157505 A1 Jun. 30, 2011

(30) Foreign Application Priority Data

Dec. 28, 2009 (TW) ................................ 98145323 A (51) Int. Cl.
*G09G 3/36* (2006.01)

(52) U.S. Cl.
USPC ............. 345/104; 345/98; 345/173; 345/174; 178/18.06

(58) Field of Classification Search
USPC ............ 345/98, 104, 173, 174, 178; 361/100; 178/18.06
See application file for complete search history.

(56) References Cited

U.S. PATENT DOCUMENTS

| | | | |
|---|---|---|---|
| 6,801,253 B1 | 10/2004 | Yonemoto et al. | |
| 7,573,459 B2 | 8/2009 | Shih et al. | |
| 7,737,940 B2 | 6/2010 | Wu et al. | |
| 2007/0040814 A1 * | 2/2007 | Lee et al. | 345/173 |
| 2007/0146282 A1 * | 6/2007 | Choo et al. | 345/98 |
| 2008/0055267 A1 | 3/2008 | Wu et al. | |
| 2008/0055809 A1 * | 3/2008 | Miyazawa | 361/100 |
| 2009/0147118 A1 | 6/2009 | Karim et al. | |
| 2010/0026639 A1 * | 2/2010 | Lee et al. | 345/173 |

FOREIGN PATENT DOCUMENTS

| | | |
|---|---|---|
| CN | 101587400 | 11/2009 |
| JP | 2008058925 A | 3/2008 |
| JP | 2010256918 A | 11/2010 |
| JP | 2010271724 A | 12/2010 |
| TW | 200813919 A | 3/2008 |
| TW | I354962 | 12/2011 |

* cited by examiner

*Primary Examiner* — Lun-Yi Lao
*Assistant Examiner* — Johny Lau
(74) *Attorney, Agent, or Firm* — WPAT, PC; Justin King (57) ABSTRACT

A touch panel includes multiple sensing units and each thereof includes a first transistor, a reference capacitor, a liquid crystal capacitor and a second transistor. ON/OFF states of the first transistor are determined by a potential provided by a corresponding scan line. The reference capacitor and the liquid crystal capacitor are coupled in series between another scan line adjacent to the corresponding scan line and a common potential. A capacitance value of the liquid crystal capacitor changes with a pressed degree of the sensing unit. ON/OFF states the second transistor are determined by a potential at a connection node between the reference capacitor and the liquid crystal capacitor. The first transistor transmits a first potential to the connection node when the first transistor is turned on, and the second transistor transmits a second potential different from the first potential to a readout line when the second transistor is turned on.

8 Claims, 7 Drawing Sheets

LIQUID CRYSTAL DISPLAY DEVICE WITH TOUCH FUNCTION AND TOUCH PANEL

BACKGROUND

1. Technical Field

The present invention relates to a touch detection field and, particularly to a liquid crystal display device with touch function and a touch panel.

2. Description of the Related Art

With the rapid development of science and technology, since flat panel display devices such as, liquid crystal display devices have many advantages of high image quality, small volume, lightweight and wide application-range, etc., and thus are widely applied into various consumer electronics products such as mobile phones, notebook computers, desktop display devices and televisions, etc. Moreover, the liquid crystal display devices have evolved into a mainstream display device in place of traditional cathode ray tube (CRT) display devices.

A touch panel provides a new human-machine interface and is more intuitional and more suitable for human nature in use. If the touch panel is integrated with a liquid crystal display device together, the liquid crystal display device then is endowed with touch function and has been become a development and application trend of the liquid crystal display device.

Figure 1:
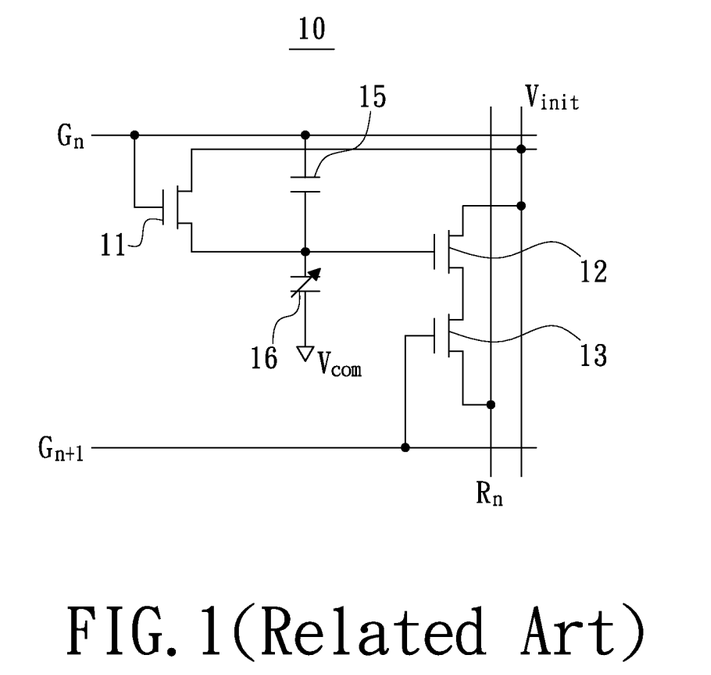
FIG. 1 shows a schematic circuit diagram of a conventional sensing unit adapted into a liquid crystal display device with touch function.

Referring to FIG. 1, showing a schematic circuit diagram of a conventional sensing/detection unit adapted into a liquid crystal display device with touch function. It is well-known that the liquid crystal display device generally includes two substrates and a liquid crystal layer sandwiched between the two substrates. One of the substrates has a plurality of scan lines and a plurality of data lines disposed on. The scan lines and the data lines are arranged crossing with each other and whereby dividing the liquid crystal display device into a plurality of pixel regions. For making the liquid crystal display device have the touch function, the liquid crystal display device further includes a plurality of sensing units which are respectively disposed in some of the pixel regions.

As shown in FIG. 1, the conventional sensing unit 10 adapted into the liquid crystal display device with the touch function generally includes three transistors and two capacitors (3T2C structure), and those are a transistor 11, a transistor 12, a transistor 13, a reference capacitor 15 and a liquid crystal capacitor 16. A gate electrode of the transistor 11 is electrically coupled to a corresponding scan line $G_n$, and a source electrode of the transistor 11 is electrically coupled to an external power source $V_{init}$. A gate electrode of the transistor 12 is electrically coupled to a drain electrode of the transistor 11, and a source electrode of the transistor 12 is electrically coupled to the external power source $V_{init}$. A gate electrode of the transistor 13 is electrically coupled to a next scan line $G_{n+1}$ adjacent to the corresponding scan line $G_n$, a source electrode of the transistor 13 is electrically coupled to a drain electrode of the transistor 12, and a drain electrode of the transistor 13 is electrically coupled to a corresponding readout line $R_n$. The reference capacitor 15 is electrically coupled between the corresponding scan line $G_n$ and the drain electrode of the transistor 11, and the liquid crystal capacitor 16 is electrically coupled between the drain electrode of the transistor 11 and a common potential $V_{com}$. It is understood to the skilled person in the art that, the liquid crystal capacitor 16 is formed by a pixel electrode, a common electrode and a liquid crystal layer sandwiched therebetween, and thus the liquid crystal capacitor 16 has a capacitance value altered in compliance with the pressed degree of the sensing unit 10.

Since the conventional sensing unit 10 necessarily needs three transistors and two capacitors and is disposed in the pixel region, a large size of the sensing unit 10 inevitably would influence the aperture ratio of the liquid crystal display device. In addition, since each of the transistors consumes a certain cross-voltage and forms a certain parasitic capacitance, excessive amount of transistors would result in the sensing unit 10 having a small range output voltage, and the excessive amount of parasitic capacitances would cause signal attenuation.

SUMMARY

The present invention is directed to a liquid crystal display device with touch function, a sensing unit thereof has relatively few electronic components.

The present invention is further directed to a touch panel, a sensing unit thereof has relatively few electronic components.

A liquid crystal display device with touch function includes a plurality of scan lines, a plurality of data lines and a plurality of sensing units. The scan lines are arranged crossing with the data lines and whereby dividing the liquid crystal display device into a plurality of pixel regions. The sensing units are disposed into the pixel regions respectively, and each of the sensing units includes a first transistor, a second transistor, a reference capacitor and a liquid crystal capacitor. The first transistor includes a first control terminal, a first terminal and a second terminal, and the first control terminal is electrically coupled to a corresponding one of the scan lines. The reference capacitor is electrically coupled between another one of the scan lines immediately adjacent to the corresponding scan line and the second terminal of the first transistor. The liquid crystal capacitor is electrically coupled between the second terminal of the first transistor and a common potential, and a capacitance value of the liquid crystal capacitor is altered by a degree of the sensing unit being pressed. The second transistor includes a second control terminal, a third terminal and a fourth terminal. The second control terminal of the second transistor is electrically coupled to the second terminal of the first transistor, and the fourth terminal is electrically coupled to a readout line. The first terminal of the first transistor is electrically coupled to receive a first potential when the first transistor is switched on, and the third terminal of the second transistor is electrically coupled to receive a second potential when the second transistor is switched on. The first potential is different from the second potential.

An exemplary touch panel adapted into a liquid crystal display device including a plurality of scan lines is provided. The touch panel includes a plurality of sensing units, and each of the sensing units includes a first transistor, a second transistor, a reference capacitor and a liquid crystal capacitor. The first transistor includes a first control terminal, a first terminal and a second terminal, and the first control terminal is electrically coupled to a corresponding one of the scan lines. The reference capacitor is electrically coupled between another one of the scan lines immediately adjacent to the corresponding scan line and the second terminal of the first transistor. The liquid crystal capacitor is electrically coupled between the second terminal of the first transistor and a common potential, and a capacitance value of the liquid crystal capacitor is altered in compliance with a degree of the sensing unit being pressed. The second transistor includes a second control terminal, a third terminal and a fourth terminal. The second control terminal of the second transistor is electrically coupled to the second terminal of the first transistor, and the fourth terminal is electrically coupled to a readout line. The first terminal of the first transistor is electrically coupled to receive a first potential when the first transistor is switched on, and the third terminal of the second transistor is electrically coupled to receive a second potential when the second transistor is switched on. The first potential is different from the second potential.

In an exemplary embodiment of the present invention, each of the sensing units further includes a third transistor. The fourth terminal of the second transistor is electrically coupled to the readout line through the third transistor. The third transistor includes a third control terminal, a fifth terminal and a sixth terminal. The third control terminal of the third transistor is electrically coupled to the another scan line immediately adjacent to the corresponding scan line, the fifth terminal of the third transistor is electrically coupled to the fourth terminal of the second transistor, and the sixth terminal of the third transistor is electrically coupled to the readout line.

In another exemplary embodiment of the present invention, the first terminal is electrically coupled to the readout line and thereby the first voltage is provided from the readout line to the first terminal when the first transistor is switched on. In addition, the third terminal of the second transistor is electrically coupled to an external power source and thereby the second voltage is provided from the external power source to the third terminal when the second transistor is switched on. Alternatively, in another exemplary embodiment, the third terminal of the second transistor is electrically coupled to the another scan line immediately adjacent to the corresponding scan line and thereby the second voltage is provided from the another scan line to the third terminal when the second transistor is switched on.

In still another exemplary embodiment of the present invention, the first terminal of the first transistor is electrically coupled to the another scan line immediately adjacent to the corresponding scan line and thereby the first voltage is provided from the another scan line to the first terminal when the first transistor is switched on. In addition, the third terminal of the second transistor is electrically coupled to an external power source and thereby the second voltage is provided from the external power source to the third terminal when the second transistor is switched on. Alternatively, in another exemplary embodiment, the third terminal of the second transistor is electrically coupled to the another scan line immediately adjacent to the corresponding scan line and thereby the second voltage is provided from the another scan line to the third terminal when the second transistor is switched on.

Another exemplary touch panel adapted into a liquid crystal display device including a plurality of scan lines is provided. The touch panel includes a plurality of sensing units, and each of the sensing units includes a first transistor, a reference capacitor, a liquid crystal capacitor and a second transistor. ON/OFF states of the first transistor are determined by a potential provided by a corresponding one of the scan lines to which the first transistor is electrically coupled. The reference capacitor and the liquid crystal capacitor are electrically coupled in series between another one of the scan lines immediately adjacent to the corresponding scan line and a common potential, and a capacitance value of the liquid crystal capacitor is altered by a degree of the sensing unit being pressed. ON/OFF states the second transistor are determined by a potential at a connection node between the reference capacitor and the liquid crystal capacitor. When the first transistor is at ON state, the first transistor transmits a received first potential to the connection node between the reference capacitor and the liquid crystal capacitor. When the second transistor is at ON state, the second transistor transmits a received second potential to the readout line for the use of judging whether the sensing unit being touched or not. The first potential is different from the second potential.

In an exemplary embodiment of the present invention, the first transistor is electrically coupled to the readout line and thereby when the first transistor is at ON state, a potential on the readout line serves as the first potential and further the first potential is transmitted to the connection node between the reference capacitor and the liquid crystal capacitor through the first transistor at ON state.

In another exemplary embodiment of the present invention, the first transistor is electrically coupled to the another scan line immediately adjacent to the corresponding scan line and thereby when the first transistor is at ON state, a potential on the another scan line immediately adjacent to the corresponding scan line serves as the first potential and further the potential is delivered to the connection node between the reference capacitor and the liquid crystal capacitor through the first transistor at ON state.

In still another exemplary embodiment of the present invention, the second transistor is electrically coupled to an external power source and thereby when the second transistor is at ON state, the second potential is provided from the external power source and further is transmitted to the readout line through the second transistor at ON state.

In even still another exemplary embodiment of the present invention, the second transistor is electrically coupled to the another scan line immediately adjacent to the corresponding scan line and thereby when the second transistor is at ON state, the second potential is provided from the another scan line immediately adjacent to the corresponding scan line and further is transmitted to the readout line through the second transistor at ON state.

In further another exemplary embodiment of the present invention, each of the sensing units further includes a third transistor. The third transistor is electrically coupled between the second transistor and the readout line. ON/OFF states of the third transistor are determined by a potential provided by the another scan line immediately adjacent to the corresponding scan line.

In summary, the sensing unit(s) in accordance with the exemplary embodiments of the present invention allow(s) the first terminal of the first transistor to be electrically coupled to receive the first potential when the first transistor is at ON state, which is for resetting the potential at the connection node. Furthermore, the sensing unit(s) allow(s) the third terminal of the second transistor to be electrically coupled to receive the second potential when the second transistor is at ON state, which is for facilitating the second potential to influence an output voltage of the readout line. In addition, such the sensing unit in accordance with the exemplary embodiments of the present invention can only use two transistors and two capacitors and thus has a relatively small size and reduced parasitic capacitance, so that the influence applied to the aperture ratio of the liquid crystal display device can be decreased and further the sensing unit can achieve a relatively large range output voltage.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Reference will now be made to the drawings to describe exemplary embodiments of the present liquid crystal display device with touch function and the present touch panel in detail. The following description is given by way of example, and not limitation.

Figure 2:
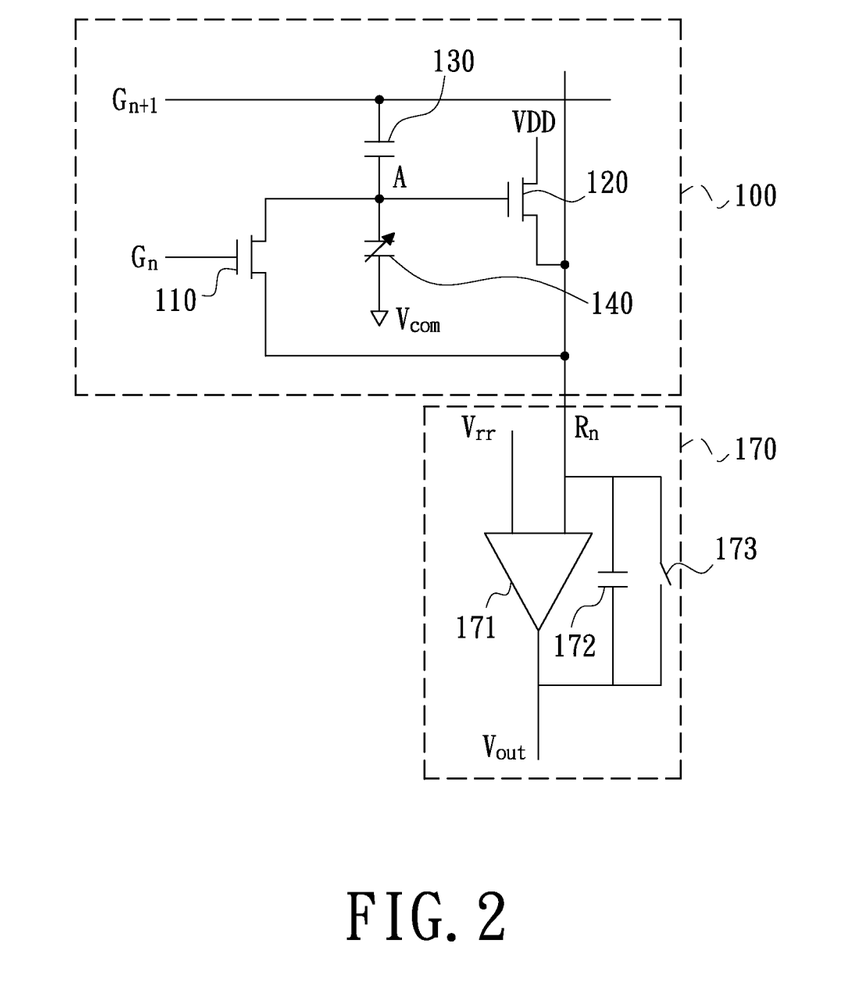
FIG. 2 shows a schematic circuit diagram of a sensing unit adapted into a liquid crystal display device with touch function, in accordance with a first exemplary embodiment of the present invention.

Referring to FIG. 2, showing a schematic circuit diagram of a sensing unit adapted into a liquid crystal display device with touch function, in accordance with a first exemplary embodiment of the present invention. The liquid crystal display device with the touch function of the present invention is similar to the conventional liquid crystal display device, except that a sensing unit of the present liquid crystal display device has a different structure. Therefore, the following exemplary embodiments of the present invention primarily introduce the sensing unit, and the detailed structure of the present liquid crystal display device will be omitted to describe.

As shown in FIG. 2, the sensing unit 100 includes a first transistor 110, a second transistor 120, a reference capacitor 130 and a liquid crystal capacitor 140. The exemplary embodiment of the present invention employs N-type transistors such as, N-type thin film transistors (N-TFT) as an example for the purpose of illustration, but the present invention is not limited in this. It is understood to the skilled person in the art that, the present invention also can employ P-type transistors instead.

A gate electrode of the first transistor 110 (also referred to as a first control terminal) is electrically coupled to a corresponding scan line $G_n$, a source electrode of the first transistor 110 (also referred to as a first terminal) is electrically coupled to a corresponding readout line $R_n$, and a drain electrode of the first transistor 110 (also referred to as a second terminal) is electrically coupled to a gate electrode of the second transistor 120 (also referred to as a second control terminal). A source electrode of the second transistor 120 (also referred to as a third terminal) is electrically coupled to an external power source voltage VDD, and a drain electrode of the second transistor 120 (also referred to as a fourth terminal) is electrically coupled to the corresponding readout line $R_n$.

The reference capacitor 130 and the liquid crystal capacitor 140 are electrically coupled in series between another scan line $G_{n+1}$ immediately adjacent to the corresponding scan line $G_n$ and a common potential $V_{com}$. In particular, the reference capacitor 130 is electrically coupled between the scan line $G_{n+1}$ and the drain electrode of the first transistor 110, and the liquid crystal capacitor 140 is electrically coupled between the drain electrode of the first transistor 110 and the common potential $V_{com}$. That is, a connection node A between the reference capacitor 130 and the liquid crystal capacitor 140 is electrically coupled to both the drain electrode of the first transistor 110 and the gate electrode of the second transistor 120.

It is understood to the skilled person in the art that, the common potential $V_{com}$ generally is the potential on a common electrode of the liquid crystal display device. Furthermore, since the liquid crystal capacitor 140 is formed by a pixel electrode, the common electrode and a liquid crystal layer sandwiched therebetween, thus the liquid crystal capacitor 140 has a capacitance value altered with a degree of the sensing unit 100 being pressed.

Furthermore, as shown in FIG. 2, the readout line $R_n$ is electrically coupled to a first input terminal of an operational amplifier 171 of a readout unit 170, a second input terminal of the operational amplifier 171 is electrically coupled to a reference voltage $V_{rr}$, and an output terminal of the operational amplifier 171 is configured (i.e., structured and arranged) for outputting an output voltage $V_{out}$. A capacitor 172 and a reset switch 173 are electrically coupled in parallel between the first input terminal and the output terminal of the operational amplifier 171.

Figure 3:
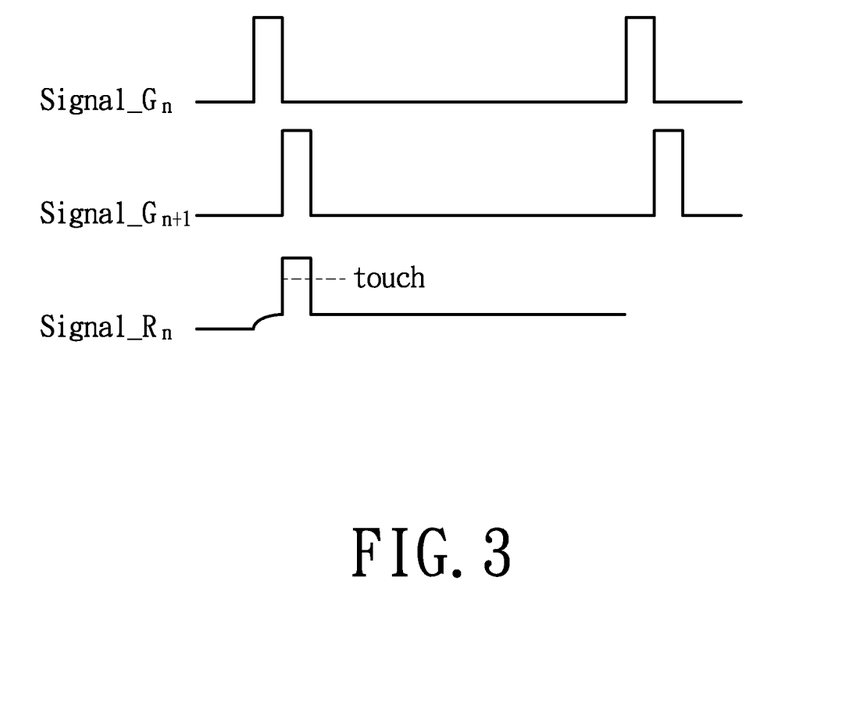
FIG. 3 shows timing diagrams of multiple signals of the sensing unit as shown in FIG. 2.

Referring to FIG. 3, showing timing diagrams of various signals associated with the sensing unit 100 as shown in FIG. 2. Please refer to FIGS. 2-3 together, it is understood to the skilled person in the art that, the liquid crystal display device would send scan signals onto the scan lines in sequence, such as sequentially send scan signals Signal_$G_n$ and Signal_$G_{n+1}$ onto the scan lines $G_n$ and $G_{n+1}$ respectively.

When the scan signal Signal_$G_n$ on the scan line $G_n$ is a logic high potential, the first transistor 110 is switched on (i.e., at ON state) to reset the readout unit 170. At this moment, the scan signal Signal_$G_{n+1}$ on the scan line $G_{n+1}$ is a logic low potential, the connection node A is electrically communicated with the readout line $R_n$ through the switched-on first transistor 110. When the readout unit 170 is reset, a potential on the readout line $R_n$ is reset to be the reference voltage $V_{rr}$. Thus, the reference voltage $V_{rr}$ provided on the readout line $R_n$ will be transmitted to the connection node A between the reference capacitor 130 and the liquid crystal capacitor 140 through the switched-on first transistor 110. In this situation, if the reference voltage $V_{rr}$ is designed to be a logic low potential, the connection node A is the logic low potential correspondingly, and thus the transistor 120 will be switched off due to the connection node A is the logic low potential.

When the scan signal Signal_$G_{n+1}$ on the scan line $G_{n+1}$ is the logic high potential, the scan signal Signal_$G_n$ on the scan line $G_n$ is the logic low potential, and thus the first transistor 110 is switched off (i.e., at OFF state). In addition, since the reference capacitor 130 and the liquid crystal capacitor 140 are electrically coupled in series between the scan line $G_{n+1}$ and the common potential $V_{com}$, the potential at the connection node A is pulled up to a certain level by the scan signal Signal_$G_{n+1}$ on the scan line $G_{n+1}$. The certain level enables the second transistor 120 to be switched on and determines the switched-on degree of the second transistor 120, so that a high potential provided from the external power source VDD can be transmitted to the readout line $R_n$ through the second transistor 120 being switched-on at a certain degree and thereby the readout line $R_n$ generates a corresponding readout signal Signal_$R_n$. In addition, it is understood to the skilled person in the art that, when the sensing unit is pressed, the capacitance value of the liquid crystal capacitor 140 is altered in this situation. With the pressed degree of the sensing unit is increased, the capacitance value of the liquid crystal capacitor 140 is increased correspondingly and the potential at the connection node A is decreased, so that the switched-on degree of the second transistor 120 is decreased and the readout signal Signal_Rn transmitted from the external power source VDD to the readout line Rn is decreased consequently. Therefore, the readout unit 170 can determine whether the sensing unit 100 is touched or not according to the readout signal Signal_$R_n$ on the readout line $R_n$.

In short, the sensing unit 100 of the present exemplary embodiment employs the reset potential Vrr (i.e., a logic low potential) provided on the readout line $R_n$ to reset the potential at the connection node A, and employs the high potential provided by the external power source VDD and the potential at the connection node A to generate the readout signal Signal_$R_n$ of the readout line $R_n$.

Since the sensing unit 100 of the present exemplary embodiment only employs two transistors and two capacitors (2T2C structure) to achieve the purpose of determining whether the sensing unit 100 is touched or not, therefore the sensing unit 100 of the present exemplary embodiment has a relatively small size, which decreases the influence applied to the aperture ratio of the liquid crystal display device. Furthermore, the present exemplary embodiment decreases the parasitic capacitance of the sensing unit 100, and thus the output voltage of the sensing unit 100 has a relatively large range.

Figure 4:
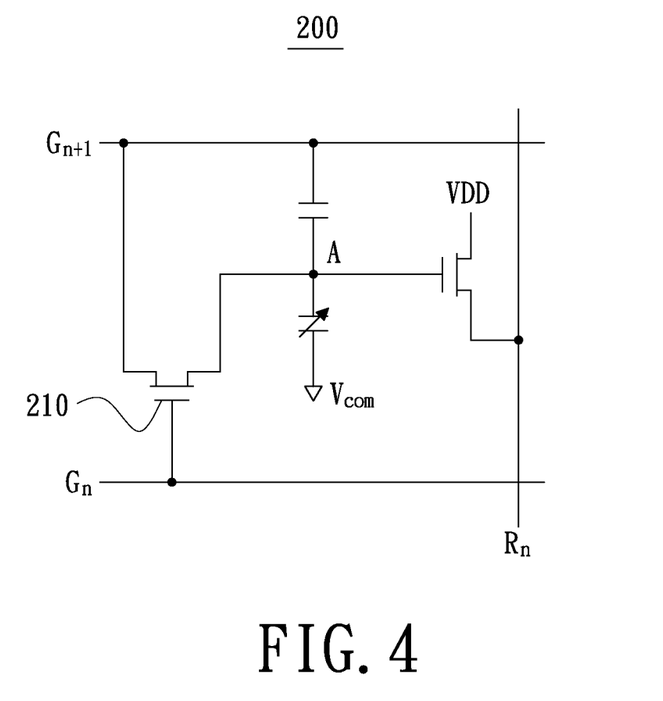
FIG. 4 shows a schematic circuit diagram of a sensing unit adapted into a liquid crystal display device with touch function, in accordance with a second exemplary embodiment of the present invention.

Referring to FIG. 4, showing a schematic circuit diagram of a sensing unit adapted into a liquid crystal display device with touch function, in accordance with a second exemplary embodiment of the present invention. As shown in FIG. 4, the sensing unit 200 of the present exemplary embodiment is similar to the sensing unit 100 as shown in FIG. 2, except that the source electrode of the first transistor 210 of the sensing unit 200 in accordance with the present exemplary embodiment is electrically coupled to the scan line $G_{n+1}$ immediately adjacent to the corresponding scan line $G_n$ instead.

When the scan signal on the scan line $G_n$ is a logic high potential, the scan signal on the scan line $G_{n+1}$ immediately adjacent to the scan line $G_n$ is a logic low potential, the first transistor 210 is switched on. The connection node A is electrically communicated with the scan line $G_{n+1}$ through the switched-on first transistor 210, and the scan signal of the logic low potential on the scan line $G_{n+1}$ is employed to reset the potential at the connection node A. That is, the sensing unit 200 of the present exemplary embodiment employs the scan line $G_{n+1}$ to provide the logic low potential to the source electrode of the transistor 210 when the first transistor 210 is switched on, which is for resetting the potential at the connection node A.

Figure 5:
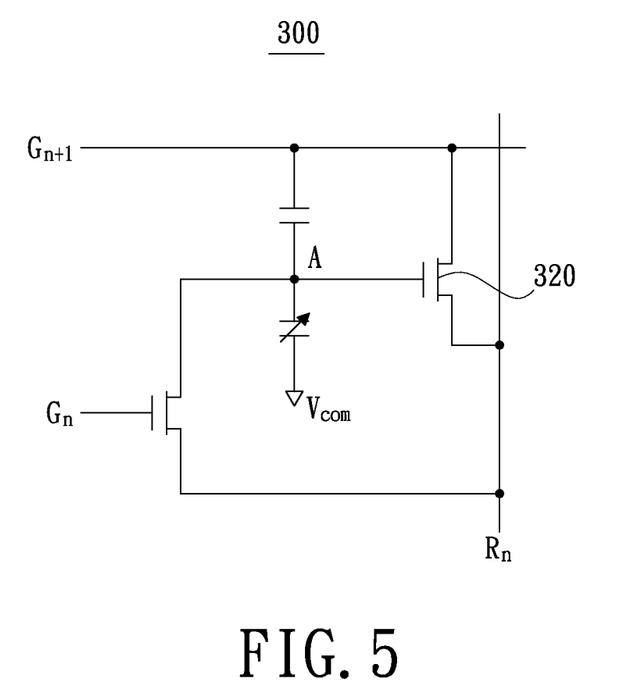
FIG. 5 shows a schematic circuit diagram of a sensing unit adapted into a liquid crystal display device with touch function, in accordance with a third exemplary embodiment of the present invention.

Referring to FIG. 5, showing a schematic circuit diagram of a sensing unit adapted into a liquid crystal display device with touch function, in accordance with a third exemplary embodiment of the present invention. As shown in FIG. 5, the sensing unit 300 of the exemplary embodiment is similar to the sensing unit 100 as shown in FIG. 1, except that the source electrode of the second transistor 320 of the sensing unit 300 of the present exemplary embodiment is electrically coupled to the scan line $G_{n+1}$ immediately adjacent to the corresponding scan line $G_n$.

When the scan signal on the scan line $G_{n+1}$ is at a logic high potential, the scan signal on the scan line $G_n$ is at a logic low potential, and the potential at the connection node A is pulled up to a certain level by the logic high potential of the scan line $G_{n+1}$, so that the second transistor 320 is switched on at a certain degree. At this moment, the source electrode of the second transistor 320 receives the scan signal with the logic high potential provided by the scan line $G_{n+1}$. That is, the sensing unit 300 of the present exemplary embodiment employs the scan line Gn+1 to provide the logic high potential to the source electrode of the second transistor 320 when the second transistor 320 is switched on, which is for generating a corresponding readout signal on the readout line $R_n$.

Figure 6:
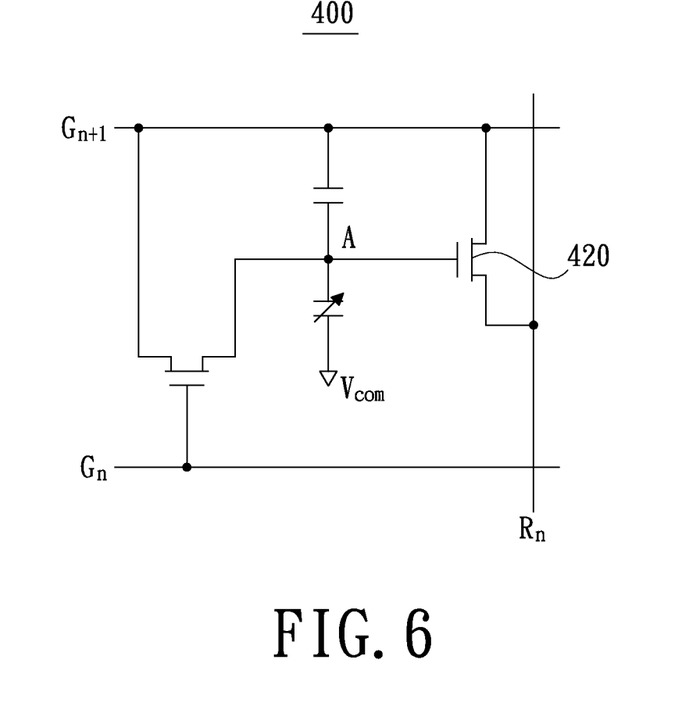
FIG. 6 shows a schematic circuit diagram of a sensing unit adapted into a liquid crystal display device with touch function, in accordance with a fourth exemplary embodiment of the present invention.

Referring to FIG. 6, showing a schematic circuit diagram of a sensing unit adapted into a liquid crystal display device with touch function, in accordance with a fourth exemplary embodiment of the present invention. As shown in FIG. 6, the sensing unit 400 of the present exemplary embodiment is similar to the sensing unit 200 as shown in FIG. 4, except that the source electrode of the second transistor 420 of the sensing unit 400 of the present exemplary embodiment is electrically coupled to the scan line $G_{n+1}$ immediately adjacent to the corresponding scan line $G_n$, such that the source electrode of the second transistor 420 can receive the scan signal with the logic high potential provided by the scan line $G_{n+1}$ when the second transistor 420 is switched on.

Figure 7:
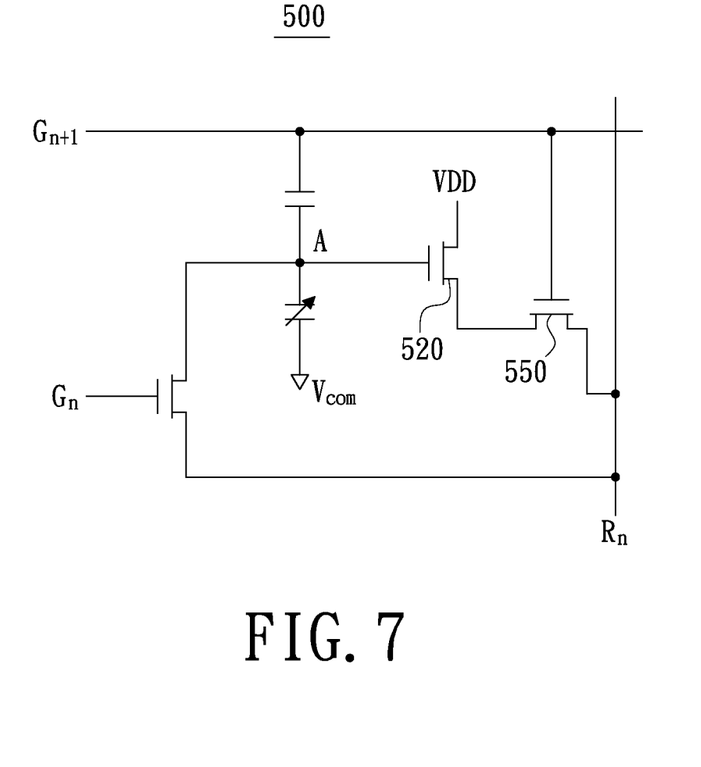
FIG. 7 shows a schematic circuit diagram of a sensing unit adapted into a liquid crystal display device with touch function, in accordance with a fifth exemplary embodiment of the present invention.

Referring to FIG. 7, showing a schematic circuit diagram of a sensing unit adapted into a liquid crystal display device with touch function, in accordance with a fifth exemplary embodiment of the present invention. As shown in FIG. 7, the sensing unit 500 of the exemplary embodiment is similar to the sensing unit 100 as shown in FIG. 2, except that the sensing unit 500 of the present exemplary embodiment further includes a third transistor 550, and the drain electrode of the second transistor 520 is electrically coupled to the readout line $R_n$ through the third transistor 550. In detailed, the gate electrode of the third transistor 550 (also referred to as a third control terminal) is electrically coupled to the scan line $G_{n+1}$ immediately adjacent to the corresponding scan line $G_n$, the source electrode of the third transistor 550 (also referred to as a fifth terminal) is electrically coupled to the drain electrode of the second transistor 520, and the drain electrode of the third transistor 550 (also referred to as a sixth terminal) is electrically coupled to the readout line $R_n$.

Since the gate electrode of the third transistor 550 is electrically coupled to the scan line $G_{n+1}$, when the scan signal on the scan line $G_{n+1}$ is at a logic high potential, the second transistor 520 is switched on and the third transistor 550 is switched on simultaneously. That is, when the second transistor 520 is switched on, the third transistor 550 also is switched on, and thus the addition of the third transistor 550 would not influence the operation principle of the present invention. Furthermore, the third transistor 550 is configured for avoiding the occurrence of large current when a voltage difference Vgs between the gate electrode and the source electrode of the second transistor 520 is approximate 0.

In summary, the sensing unit in accordance with the various embodiments of the present invention makes the source electrode of the first transistor be electrically coupled to receive the first potential (e.g., a logic low potential) when the first transistor is at ON state, which is for resetting the potential at the connection node A, and further makes the source electrode of the second transistor be electrically coupled to receive the second potential (e.g., a logic high potential) when the second transistor is at ON state, which is for generating the readout signal on the readout line according to the second potential.

In addition, the sensing unit in accordance with the various embodiments of the present invention primarily employs two transistors and two capacitors (2T2C structure) to determine/detect whether the sensing unit is touched or not. Therefore, the sensing unit can have a small size, which can reduce the influence applied to the aperture ratio of the liquid crystal display device. Furthermore, the present invention reduces the parasitic capacitance of the sensing unit, and thus the output voltage of the sensing unit can achieve a relatively large range.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A liquid crystal display device with touch function, comprising:
   a plurality of scan lines;
   a plurality of data lines arranged crossing with the scan lines and whereby dividing the liquid crystal display device into a plurality of pixel regions;
   a plurality of sensing units disposed in the pixel regions respectively, wherein each of the sensing units comprises:
      a first transistor comprising:
         a first control terminal electrically coupled to a corresponding one of the scan lines;
         a first terminal; and
         a second terminal;
      a reference capacitor electrically directly coupled between another one of the scan lines adjacent to the corresponding scan line and the second terminal of the first transistor;
      a liquid crystal capacitor electrically directly coupled between the second terminal of the first transistor and a common potential, and a capacitance value of the liquid crystal capacitor being altered in compliance with a degree of the sensing unit being pressed;
   wherein the first terminal of the first transistor is electrically directly coupled to the readout line and thereby the first potential is provided from the readout line to the first terminal when the first transistor is switched on.

2. The liquid crystal display device with touch function as claimed in claim 1, wherein each of the sensing units further comprises:
   a third transistor, wherein the fourth terminal of the second transistor is electrically coupled to the readout line through the third transistor, and the third transistor comprises:
      a third control terminal electrically coupled to the another scan line adjacent to the corresponding scan line;
      a fifth terminal electrically coupled to the fourth terminal of the second transistor; and
      a sixth terminal electrically coupled to the readout line.

3. The liquid crystal display device with touch function as claimed in claim 1, wherein the third terminal of the second transistor is electrically coupled to an external power source and thereby the second potential is provided from the external power source to the third terminal when the second transistor is switched on.

4. A touch panel adapted into a liquid crystal display device comprising a plurality of scan lines, wherein the touch panel comprises a plurality of sensing units, and each of the sensing units comprises:
   a first transistor comprising:
      a first control terminal electrically coupled to a corresponding one of the scan lines;
      a first terminal; and
      a second terminal;
   a reference capacitor electrically directly coupled between another one of the scan lines adjacent to the corresponding scan line and the second terminal of the first transistor;
   a liquid crystal capacitor electrically directly coupled between the second terminal of the first transistor and a common potential, and a capacitance value of the liquid crystal capacitor being altered in compliance with a degree of the sensing unit being pressed;
   wherein the first terminal of the first transistor is electrically directly coupled to the readout line and thereby the first potential is provided from the readout line to the first terminal when the first transistor is switched on.

5. The touch panel as claimed in claim 4, wherein the third terminal of the second transistor is electrically coupled to an external power source and thereby the second potential is provided from the external power source to the third terminal when the second transistor is at switched-on state.

6. A touch panel adapted into a liquid crystal display device comprising a plurality of scan lines, wherein the touch panel comprises a plurality of sensing units, and each of the sensing units comprises:
   a first transistor, wherein ON and OFF states of the first transistor are determined by an potential provided by a corresponding one of the scan lines;
   a reference capacitor;
   a liquid crystal capacitor, wherein the reference capacitor and the liquid crystal capacitor are electrically directly coupled in series between another one of the scan lines adjacent to the corresponding scan line and a common potential, and a capacitance value of the liquid crystal capacitor is adapted to be altered by a pressed degree of the sensing unit;
   wherein the first transistor is electrically directly coupled to the readout line and thereby when the first transistor is at ON state, an potential on the readout line serves as the first potential and further the first potential is delivered to the connection node between the reference capacitor and the liquid crystal capacitor through the first transistor at ON state.

7. The touch panel as claimed in claim 6, wherein the second transistor is electrically coupled to an external power source and thereby when the second transistor is at ON state, the second potential is provided from the external power source and further transmitted to the readout line through the second transistor at ON state.

8. The touch panel as claimed in claim 6, wherein each of the sensing unit further comprises a third transistor, the third transistor is electrically coupled between the second transistor and the readout line, and further ON/OFF states of the third transistor are determined by a potential provided by the another scan line adjacent to the corresponding scan line.

* * * * *